(12) United States Patent
Weiher et al.

(10) Patent No.: US 12,401,168 B2
(45) Date of Patent: Aug. 26, 2025

(54) RADIO FREQUENCY SLAB LASER

(71) Applicant: KERN TECHNOLOGIES, LLC, Wadena, MN (US)

(72) Inventors: Keith L Weiher, Wadena, MN (US); Gerald L Kern, Wadena, MN (US); Jacob D Colby, Wadena, MN (US); Paul E Jackson, Wadena, MN (US)

(73) Assignee: KERN TECHNOLOGIES, LLC, Wadena, MN (US)

( * ) Notice: Subject to any disclaimer, the term of this patent is extended or adjusted under 35 U.S.C. 154(b) by 597 days.

(21) Appl. No.: 17/935,351

(22) Filed: Sep. 26, 2022

(65) Prior Publication Data

US 2023/0170663 A1   Jun. 1, 2023

(30) Foreign Application Priority Data

Nov. 30, 2021 (EP) .................................. 21211527

(51) Int. Cl.
| | |
|---|---|
| *H01S 3/041* | (2006.01) |
| *H01S 3/03* | (2006.01) |
| *H01S 3/038* | (2006.01) |
| *H01S 3/04* | (2006.01) |
| *H01S 3/0975* | (2006.01) |

(52) U.S. Cl.
CPC ............ *H01S 3/041* (2013.01); *H01S 3/0315* (2013.01); *H01S 3/038* (2013.01); *H01S 3/0407* (2013.01); *H01S 3/0975* (2013.01)

(58) Field of Classification Search
CPC ...... H01S 3/0315; H01S 3/038; H01S 3/0407; H01S 3/041; H01S 3/0975
See application file for complete search history.

(56) References Cited

U.S. PATENT DOCUMENTS

| | | | |
|---|---|---|---|
| 5,123,028 A | 6/1992 | Hobart | |
| 5,164,952 A | 11/1992 | Guenther | |
| 5,596,597 A * | 1/1997 | Nishida | ..................... H01S 3/02 372/107 |
| 7,558,308 B2 | 7/2009 | Shackleton | |
| 8,731,015 B2 | 5/2014 | Newman | |
| 9,263,849 B2 | 2/2016 | Kern | |
| 2005/0175054 A1* | 8/2005 | Shackleton | ........... H01S 3/0315 372/87 |

(Continued)

*Primary Examiner* — James A Menefee
(74) *Attorney, Agent, or Firm* — Nemphos Braue LLC; Michael Antone

(57) ABSTRACT

A radio frequency, RF, slab laser comprising a live electrode (102) and a ground electrode (108) whose inwardly facing surfaces face each other to form a gap for forming a plasma discharge when the live electrode is supplied with a suitable RF drive signal. The electrodes are enclosed in a vacuum space by a vacuum housing (114) with an access aperture (116). The access aperture is sealed with a vacuum flange (70) that comprises an electrically insulating connector. A plurality of hollow conductors (62) are arranged to extend through the vacuum flange into the vacuum space and connect with the live electrode. The hollow conductors connect to the live electrode to supply it with its RF drive signal and also coolant fluid which is distributed through fluid circulation channels (80a, 80b). Coolant fluid is supplied to the live electrode through certain ones of the hollow conductors and taken out by others.

16 Claims, 13 Drawing Sheets

(56) References Cited

U.S. PATENT DOCUMENTS

| | | | |
|---|---|---|---|
| 2005/0180483 A1* | 8/2005 | Taufenbach | H01S 3/038 |
| | | | 372/87 |
| 2006/0029116 A1* | 2/2006 | Shackleton | H01S 3/09705 |
| | | | 372/55 |
| 2010/0118901 A1 | 5/2010 | Newman | |
| 2010/0189156 A1 | 7/2010 | Clementi | |
| 2011/0182319 A1* | 7/2011 | Hua | H01S 3/134 |
| | | | 372/55 |
| 2012/0033703 A1 | 2/2012 | Newman | |
| 2012/0106586 A1 | 5/2012 | Villarreal-Saucedo et al. | |
| 2015/0188282 A1* | 7/2015 | Kern | H01S 3/09702 |
| | | | 372/38.04 |
| 2019/0181028 A1 | 6/2019 | Patel | |

* cited by examiner

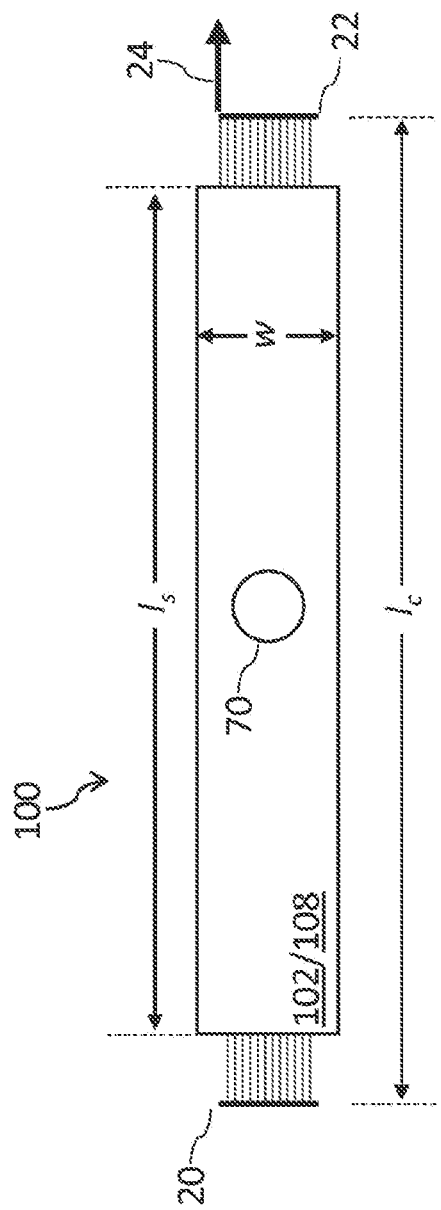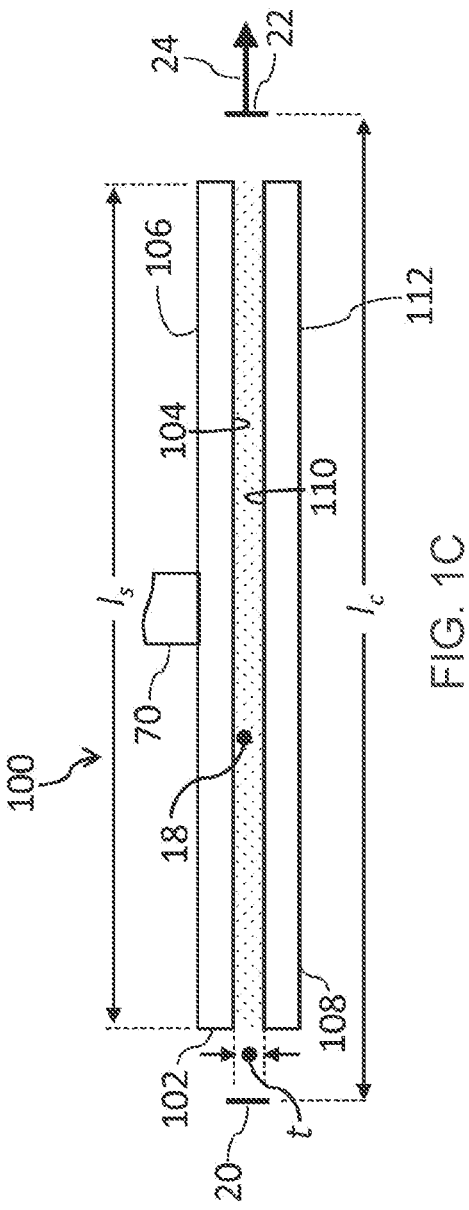
FIG. 1B
FIG. 1C

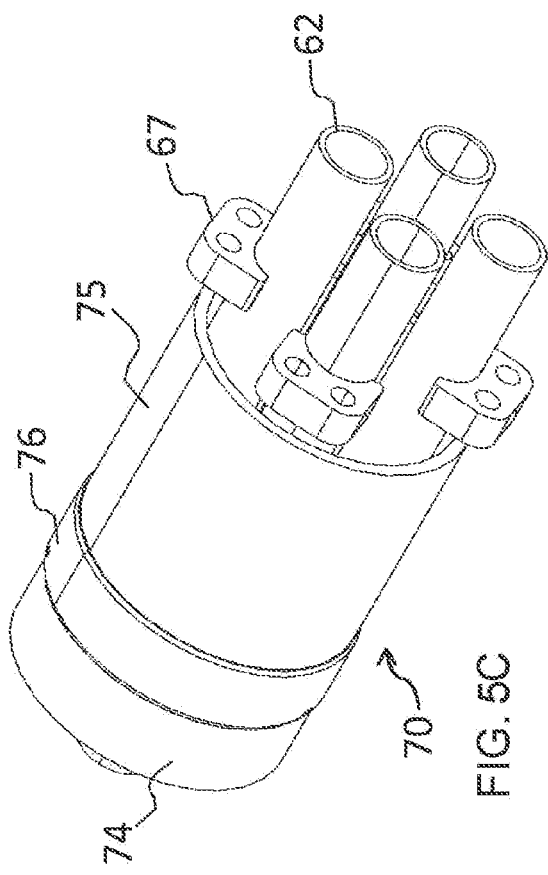
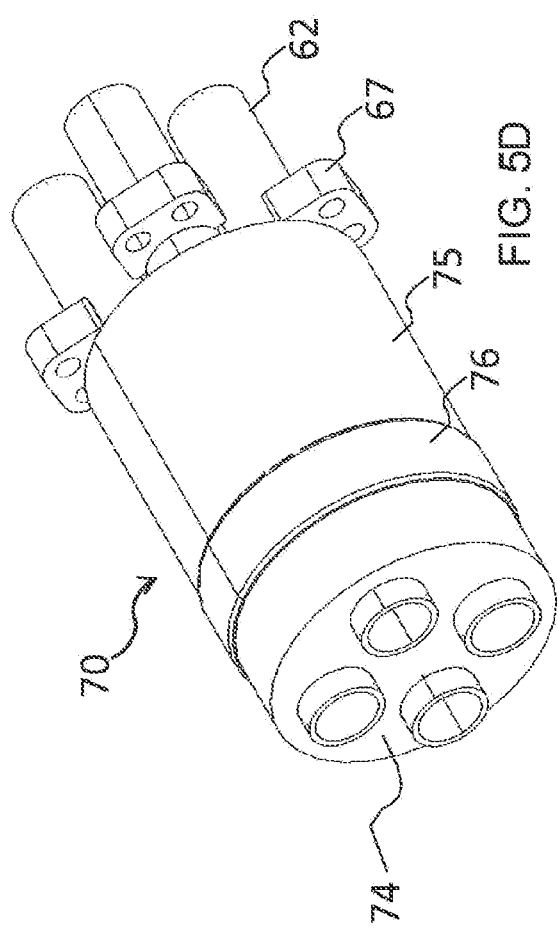
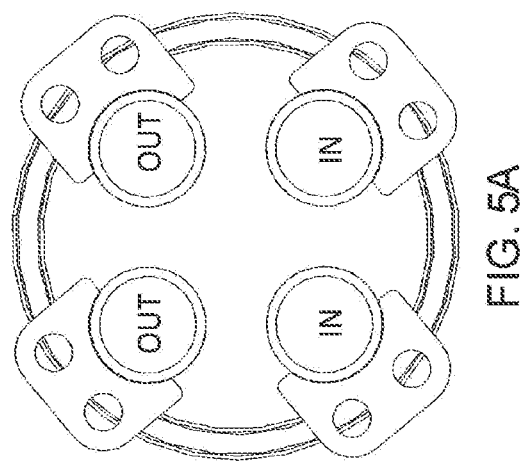
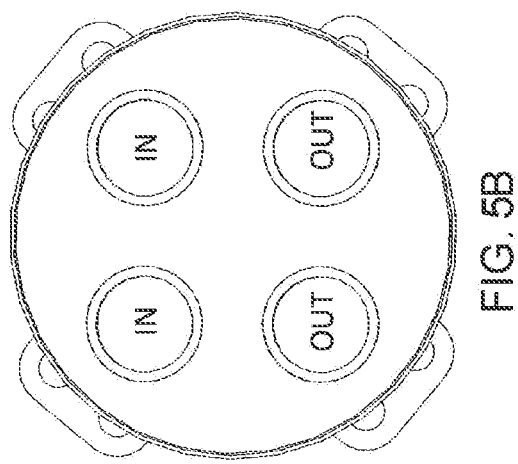

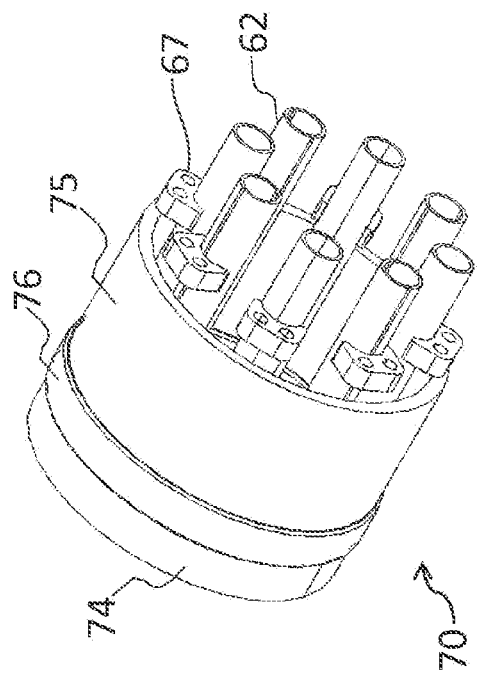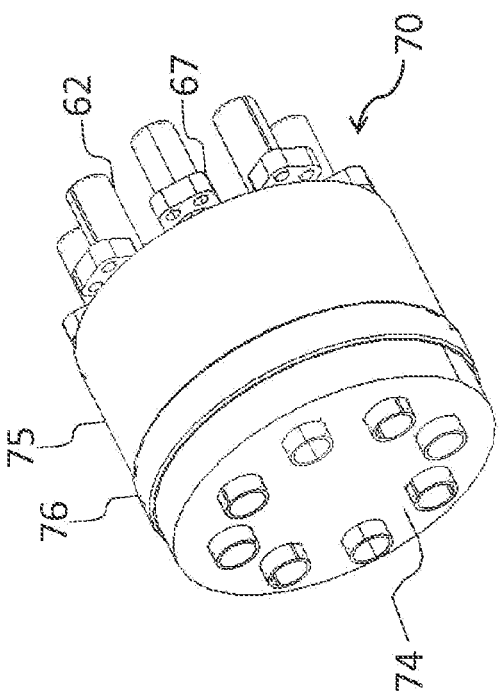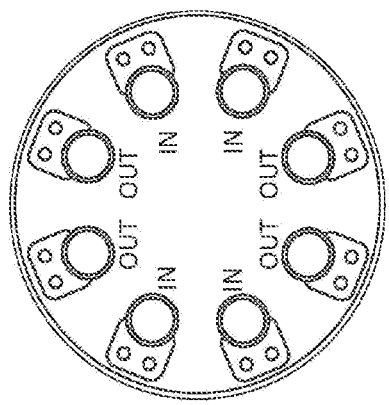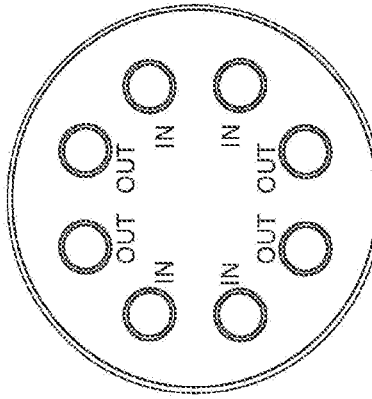

RADIO FREQUENCY SLAB LASER

FIELD OF THE INVENTION

The present disclosure relates to a radio frequency (RF) slab laser.

BACKGROUND

An RF slab laser is a laser with a kind of flat planar construction, which in its simplest form has only two electrodes. The two electrodes are arranged on top of each other so that their inwardly facing surfaces form a gap of a certain thickness. When an RF drive signal is applied to the electrodes, a plasma discharge of a gas, such as carbon dioxide, is formed in the gap. The plasma provides a gain medium capable of supporting stimulated emission within a resonator cavity formed by end mirrors which are typically arranged just outside the gap. The electrodes, or at least the gap between them where the plasma is to be formed, needs to be in a vacuum. In most commercial designs, the plasma is induced between a "cold" ground electrode and an RF driven "live" or "hot" electrode. However, it is also possible to use two RF electrodes that are both "live" and driven with complementary phases.

In RF slab lasers there is inevitably a heat management issue with the electrodes, in particular for the live electrode. For RF slab lasers with lower output powers, an internal conduction cooling path to an external air-cooled heat exchanger is generally adequate, whereas for higher laser output powers the electrodes typically need to be cooled by circulating a coolant fluid, typically water, around the electrode.

Some known approaches for water cooling of high powered RF slab lasers are now summarized.

U.S. Pat. No. 5,123,028 discloses a carbon dioxide slab laser with water cooling for the live electrode and the ground electrode. For each electrode, a coolant loop is provided by a copper pipe which is soldered into channels that have been machined out of the outwardly facing surfaces of the electrodes. The ends of the pipes pass through the end plate of the vacuum housing and are electrically grounded. The center segment of the coolant pipe that is in physical contact with the live electrode needs to be electrically isolated from the grounded part of the coolant pipe. This is done with a pair of in-line union connectors made of an electrically insulating material, so that the part of the pipe which is live is electrically isolated from the remainder of the pipe which is grounded. A drawback of the design of U.S. Pat. No. 5,123,028 is the need for the insulating union connectors. These add cost to the laser manufacture and are a potential water leak source as well as sometimes being an unwanted generator of RF discharge, since they form a junction between live and ground.

U.S. Pat. No. 8,731,015B2 discloses a carbon dioxide slab laser which has a special design for cooling the live electrode involving a double-folded assembly of coolant tubes that are in thermal contact with the live electrode. The coolant tubes have a very high RF-impedance which avoids the need for them to be electrically insulated from the laser housing and so dispenses with the need for the insulating union connectors of U.S. Pat. No. 5,123,028. The coolant tube is dimensioned to extend beyond the end of the electrode through which it passes by an amount that provides a sufficiently high inductance at the RF frequency (e.g. about 100 MHz) that it can contact the grounded vacuum housing without causing a short circuit.

US2010189156A1 discloses a carbon dioxide slab laser in which both the live and ground electrodes have their outwardly facing surfaces outside the vacuum enclosure. Coolant channels are formed in each electrode by four lengthways grooves formed in the outwardly facing surface. On each electrode an insert piece is screwed onto the outwardly facing surface to close the grooves in a liquid-tight manner and thereby form the coolant channels. For each electrode, the coolant fluid is introduced into the ends of the groove channels by a pair of connector pipes. The coolant fluid then flows along the electrode from one end to the other through the groove channels. The coolant fluid is then extracted from the other end by another pair of connector pipes.

U.S. Pat. No. 9,263,849B2 discloses an alternative approach for designing a high power RF slab laser which can avoid the need for water cooling of the RF feed-through by improving the efficiency of the RF coupling into the live electrode and hence reducing the amount of heat that is generated in the RF feed-through. The outputs from four RF power amplifiers are passed through their own impedance matching circuits and then connected individually and separately to the live electrode. This design reduces the amount of heat generated by a factor 'n' compared with a design in which a single RF supply line is routed into the vacuum enclosure and contacted to the live electrode via a single impedance matching circuit, e.g. a factor of four in the example of having four pairs of RF power amplifier and impedance matching circuit. This improvement is achieved because the heat generated by the impedance matching circuit is proportional to the square of the current, so having 'n' independent current injectors each carrying 'I/n' of the total current injected into the live electrode reduces the heating by a factor 'n' compared with having a single current injector supplying the live electrode with the whole current.

U.S. Pat. No. 5,164,952 discloses an RF slab laser with a live electrode and a ground electrode arranged in a vacuum housing. Metal coolant tubes feed coolant fluid through an end wall of the laser into an RF-tight antechamber that is adjacent one end of the vacuum housing. The metal coolant tubes are joined to short electrically insulating sections in the antechamber whose other ends are joined to further metal tubes. Within the antechamber, the further metal tubes are connected to a T-shaped conductive clamp that transfers RF power to the further metal tubes. The further metal tubes are then fed through into the vacuum chamber via a vacuum-tight ceramic disc that insulates the vacuum housing from the RF. The further metal tubes once inside the vacuum chamber then bend through 90 degrees to connect onto the top surface of the live electrode, thereby supplying the live electrode with RF power as well as supplying (and removing) coolant fluid to (and from) the live electrode.

BRIEF SUMMARY OF THE INVENTION

According to one aspect of the disclosure, there is provided an RF slab laser comprising: a first electrode and a second electrode having respective inwardly and outwardly facing surfaces, wherein their respective inwardly facing surfaces face each other and are spaced apart by a gap forming a slab waveguide of a thickness dimensioned to allow a plasma discharge to be formed by driving at least the first electrode with an RF drive signal, the first electrode being provided with at least one fluid circulation channel for distributing coolant fluid around the first electrode, a vacuum housing enclosing at least the inwardly facing surfaces of the first and second electrodes inside a vacuum space; and a plurality of hollow conductors connected to the outwardly facing surface of the first electrode to supply the RF drive signal to the first electrode and the coolant fluid to the at least one fluid circulation channel of the first electrode. Moreover, the vacuum housing has an access aperture adjacent the outwardly facing surface of the first electrode. Further, the vacuum flange is arranged in the access aperture to form a vacuum-tight seal with the vacuum housing and a further vacuum-tight seal with the outwardly facing surface of the first electrode.

In one embodiment, the vacuum flange comprises a sleeve, an electrically insulating connector and a base, the base having an intermediate length portion of each hollow conductor embedded therein in a vacuum-tight manner, and the electrically insulating connector being connected with respective vacuum-tight connections between the sleeve and the base, wherein the sleeve forms said vacuum-tight seal with the vacuum housing and wherein the base forms said further vacuum-tight seal with the outwardly facing surface of the first electrode.

In another embodiment, the vacuum flange comprises an electrically insulating connector extending from the access aperture, where it forms said vacuum-tight seal with the vacuum housing, to the outwardly facing surface of the first electrode, where it forms said further vacuum-tight seal with the outwardly facing surface of the first electrode, thereby defining a portion of the outwardly facing surface of the first electrode that is outside the vacuum space to which the hollow conductors are connected.

In a further embodiment, the vacuum flange comprises a sleeve and an electrically insulating connector, wherein the sleeve forms said vacuum-tight seal with the vacuum housing and wherein the insulating connector forms said further vacuum-tight seal with the outwardly facing surface of the first electrode.

In other embodiments, at least a portion of the outwardly facing surface of the first electrode is outside the vacuum space and is used to connect the hollow conductors. The hollow conductors thus remain outside the vacuum space obviating the need for a vacuum feed-through. This may be implemented by the vacuum housing being provided with an access aperture and by providing an electrically insulating connector that extends from the access aperture, where it forms a vacuum-tight seal, to the outwardly facing surface of the first electrode, where it forms a further vacuum-tight seal. Said portion of the outwardly facing surface of the first electrode that is outside the vacuum space is thus formed by the access aperture in combination with the electrically insulating connector which may be hollow, e.g. a cylindrical tube that is dimensioned to match a circular-shaped access aperture.

There are different alternatives for forming the fluid circulation channels. In some embodiments, each fluid circulation channel comprises at least one internal passage formed within the first electrode which terminates in apertures in a surface of the first electrode, for example the outwardly facing surface of the first electrode, for coolant fluid input and output, the fluid input and output apertures being arranged in fluid-flow connection with proximal ends of the hollow conductors. One implementation of such embodiments is for the fluid input and output apertures to be arranged aligned with the proximal ends of the hollow conductors. 1s In other embodiments, the fluid circulation channel(s) comprise further hollow conductors arranged in thermal contact with the outwardly facing surface of the first electrode (e.g. by soldering as described for the live electrode in the above-referenced U.S. Pat. No. 5,123,028) and in fluid-flow connection with the hollow conductors of the vacuum feed-through. The hollow conductors may be formed integrally with the further hollow conductors, i.e. as single hollow conductors, similar to what is shown for the live electrode in the above-referenced U.S. Pat. No. 5,123,028. In such embodiments, the coolant channels are thus formed by hollow conductors rather than internal coolant channels formed within the electrode(s).

In some embodiments, the first electrode has an elongate shape with a length several times greater than its width (e.g. at least 5 or 10 times) and the hollow conductor connections are positioned at least approximately mid-way along the outwardly facing surface of the first electrode, thereby subdividing the first electrode into first and second arms. Each arm is preferably provided with at least one fluid circulation channel, namely a first fluid circulation channel extending around the first arm of the first electrode and a second fluid circulation channel extending around the second arm of the first electrode.

In one particular implementation, the first fluid circulation channel is connected to be supplied with coolant fluid by first and second ones of the hollow conductors and the second fluid circulation channel may be connected to be supplied with coolant fluid by third and fourth ones of the hollow conductors. This is a 4-pin arrangement of hollow conductors which allows the first electrode to be supplied directly with four independent RF supplies, i.e. the RF drive signal has four independent components which are not combined but rather are connected independently to the first electrode by four of the hollow conductors. Here there may be first and second fluid circulation channels extending around the first arm of the first electrode and third and fourth fluid circulation channels extending around the second arm of the first electrode.

In another particular implementation, the first fluid circulation channel is connected to be supplied with coolant fluid by first and second ones of the hollow conductors and wherein the second fluid circulation channel is connected to be supplied with coolant fluid by third and fourth ones of the hollow conductors, wherein the third fluid circulation channel is connected to be supplied with coolant fluid by fifth and sixth ones of the hollow conductors and wherein the fourth fluid circulation channel is connected to be supplied with coolant fluid by seventh and eighth ones of the hollow conductors. This is an 8-pin arrangement of hollow conductors which allows the first electrode to be supplied directly with eight independent RF supplies, i.e. the RF drive signal has eight independent components which are not combined but rather are connected independently to the first electrode by eight of the hollow conductors. Here the first and second fluid circulation channels may be jointly arranged to cool either side of the first arm, wherein the third and fourth fluid circulation channels may be jointly arranged to cool either side of the second arm, thereby to avoid a temperature gradient forming crossways between opposite sides of the first electrode.

A convenient construction feature is for each hollow conductor to be provided with a tab located outside the vacuum housing via which it is supplied with the RF drive signal, e.g. by fixing one end of an inductive strap to the tab.

The laser may further comprise a plurality of RF amplifiers and associated impedance matching circuits for generating a plurality of components of the RF drive signal, respective ones of the hollow conductors being connected to receive respective ones of the RF drive signal components output from respective ones of the impedance matching circuits. The RF amplifiers, impedance matching circuits, and hollow conductors may be connected to form one or more groups. Each group may consist of two RF amplifiers, two impedance matching circuits and two hollow conductors. Moreover, each said group can be associated with one circulation channel. Here one hollow conductor of a group supplies coolant fluid and the other extracts it. The laser may further comprise electrically insulating connector pieces connected to distal ends of the hollow conductors, the connector pieces being configured to connect with respective fluid supply lines.

In further embodiments, the above-mentioned design features of the first electrode may be replicated for the second electrode. This may be of interest in particular for designs in which both the first and second electrodes are driven with RF, e.g. when the first and second electrodes are driven with respective RF drive signals that are out of phase with each other.

BRIEF DESCRIPTION OF THE DRAWINGS

In the following, the present invention will further be described by way of example only with reference to exemplary embodiments illustrated in the figures.

FIGS. 1B and 1C are schematic plan and side views showing principal optical components of the RF slab laser of FIG. 1A.

FIGS. 5A to 5D show a 4-way vacuum feed-through in plan view from above and below as well as perspective view from above and below.

FIGS. 8A to 8D show an 8-way vacuum feed-through in plan view from above and below as well as perspective view from above and below.

FIGS. 9 and 10 are schematic plan and perspective views of a top electrode and vacuum feed-through for a further embodiment in which the top electrode has four fluid circulation channels and is connected to an 8-way vacuum feed-through.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1A:
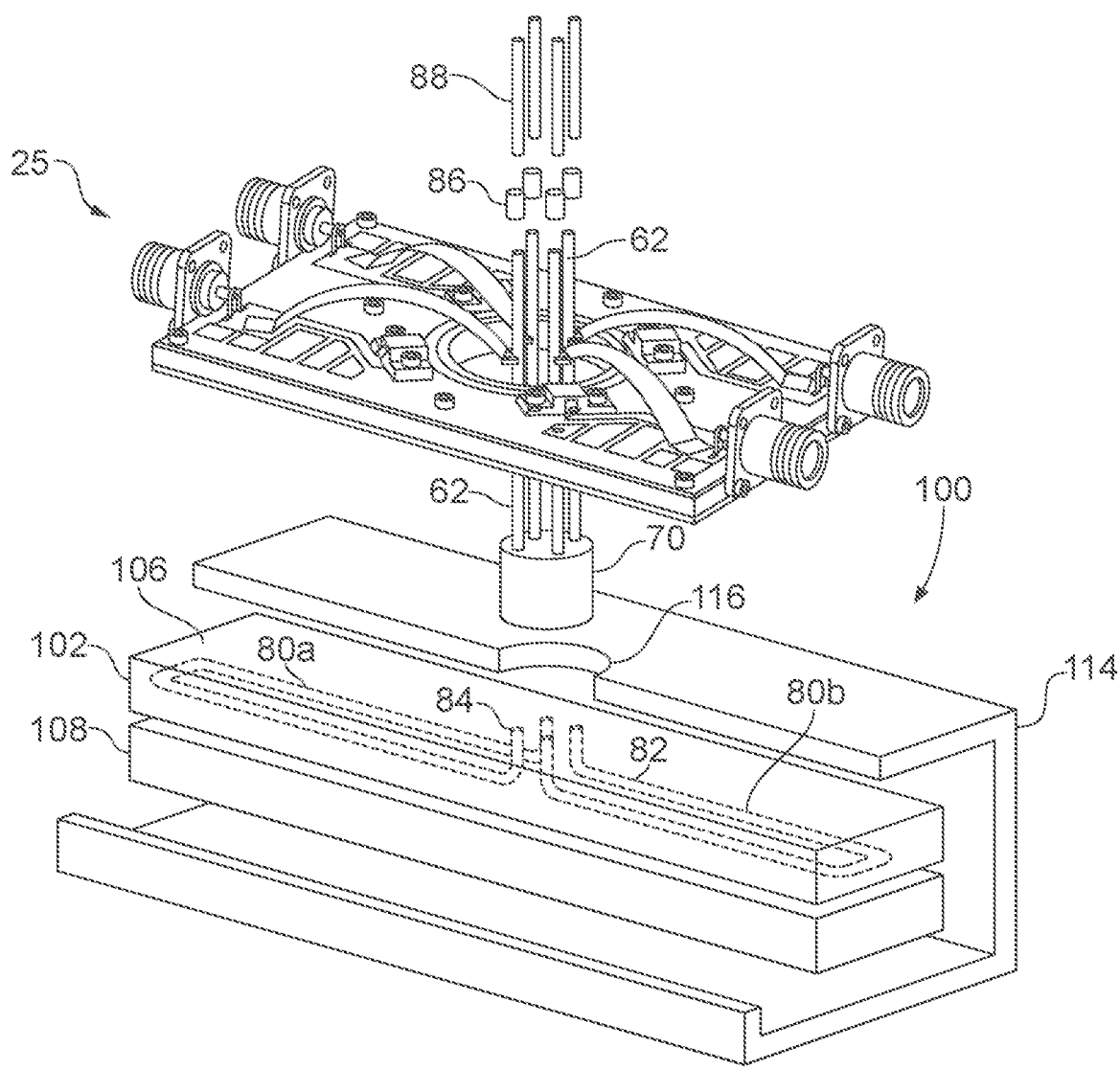
FIG. 1A is an exploded perspective view showing an RF slab laser according to an embodiment of the invention with an RF supply consisting of four RF amplifiers, an impedance matching network consisting of four impedance matching circuits, a four-way vacuum feed-through and a top electrode with two fluid circulation channels for cooling.

FIG. 1A is an exploded perspective view showing an RF slab laser 100 according to an embodiment of the invention. FIGS. 1B and 1C are schematic plan and side views showing the principal optical components of the RF slab laser 100. The laser 100 includes a vacuum housing 114 (shown partially cut away in FIG. 1A) that forms a vacuum enclosure to contain a gaseous lasing medium. The lasing medium of a slab laser is a plasma of a gas, most commonly carbon dioxide as the active molecule, although other gases such as carbon monoxide, helium and nitrogen as well as gas mixtures containing one or more of these gases are known. The laser 100 further comprises a top electrode 102 driven with RF power and a bottom electrode 108 which is grounded, the two electrodes having respective inwardly facing surfaces 104, 110 as well as outwardly facing surfaces 106, 108 that face outwards towards the walls of the vacuum housing 114. In the illustrated design, both electrodes 102, 108 are arranged inside the vacuum housing 114.

The inwardly facing surfaces 104 and 110 of the top and bottom electrodes 102 and 108 are spaced apart by a gap of thickness 't', and each have a width 'w' and a length 'ls' to form a slab (see FIGS. 1B and 1C). The gap is dimensioned to allow a plasma discharge 18, shown schematically with the stippling, to be formed by applying an RF electrical drive signal to the top electrode 102 while the bottom electrode is grounded. In the following, the top electrode 102 is therefore sometimes referred to as the live, hot or driven electrode and the bottom electrode 108 as the ground(ed) electrode. A resonator cavity for the laser is formed by a pair of mirrors 20, 22. Mirror 20 is an end reflector of ideally 100% reflectivity. Mirror 22 is an output coupler which may provide output coupling by being partially transmissive (as would be a usual choice for a stable resonator design), or, as schematically illustrated, with edge coupling by configuring the cavity such that a small portion of the beam path passes by the lateral edge of the output mirror (as would be a usual choice for an unstable confocal resonator design) so that the output beam, labelled 24, is emitted from the side of the output mirror 22. Because of construction considerations, the cavity mirrors are placed outside the slab, so the cavity length is greater than the slab length. It will also be understood that the cavity mirrors may be planar or curved. A vacuum flange 70 for feed-through of the RF drive signal and the coolant fluid to the top electrode 102 extends into contact with the outwardly facing surface 106.

The vacuum flange 70 is sealingly mounted in an access aperture 116 in the vacuum housing 114. The vacuum flange 70 has end portions of a plurality of hollow conductors 62 mounted therein. The top ends of the hollow conductors 62 are connected via electrically insulating pipe fitting connections 86, e.g. made of plastic, to respective coolant pipes 88 which serve to carry coolant fluid, e.g. water, into and out of the vacuum housing 114, where the water is circulated through or over the top electrode 102 via one or more fluid circulation channels 80. Coolant fluid is thereby passed through the vacuum flange 70 around the top electrode 102 and then back out of the vacuum flange 70. In FIG. 1A, two such fluid circulation channels 80a, 80b are schematically shown. Each fluid circulation channel 80 is formed by internal passages 82 within the top electrode 102. In the illustrated embodiment, there is one hollow conductor for input and one for output for each fluid circulation channel 80a, 80b. The internal passages 82 terminate in apertures 84 in the external (upper) surface 106 of the top electrode 102 and form fluid-flow connections with the proximal ends of the hollow conductors 62. The vacuum flange 70 is arranged with its underside or bottom surface abutting or affixed to the outwardly facing surface of the top electrode 102. The hollow conductors 62 that are fed through the vacuum flange 70 are arranged collectively so that they connect the top electrode 102 at or close to its geometric center (in plan view). This provides for symmetric dispersion of RF energy over the top electrode 102. Alternatively, in other designs, the connections need not be positioned at the geometric center and could be anywhere along the outwardly facing surface of the top electrode 102.

Variants for the ground electrode 108 would include having the ground electrode 108 formed integrally with the vacuum housing 114 or with its outwardly facing surface 112 outside the vacuum enclosure, i.e. on the air side, and its inwardly facing surface 110 inside the vacuum housing 114. Variants for the live electrode 102 would include having the its outwardly facing surface 106, or at least a portion thereof where the hollow conductors are connected, outside the vacuum enclosure and its inwardly facing surface 104 inside the vacuum housing 114. The hollow conductors 62 need not all be connected to the outwardly facing surface 106 of the live electrode 102 in a confined area as in the present embodiment. Rather, in a variant in which at least a substantial proportion of the length of the outwardly facing surface 106 of the live electrode 102 is outside the vacuum, e.g. more than half or at least three quarters, the hollow conductors 62 may have their connections to the live electrode distributed, e.g. evenly spaced apart, along the exposed, i.e. air side, part of the length of the outwardly facing surface 106 of the live electrode 102, e.g. singly or in pairs.

Figure 2:
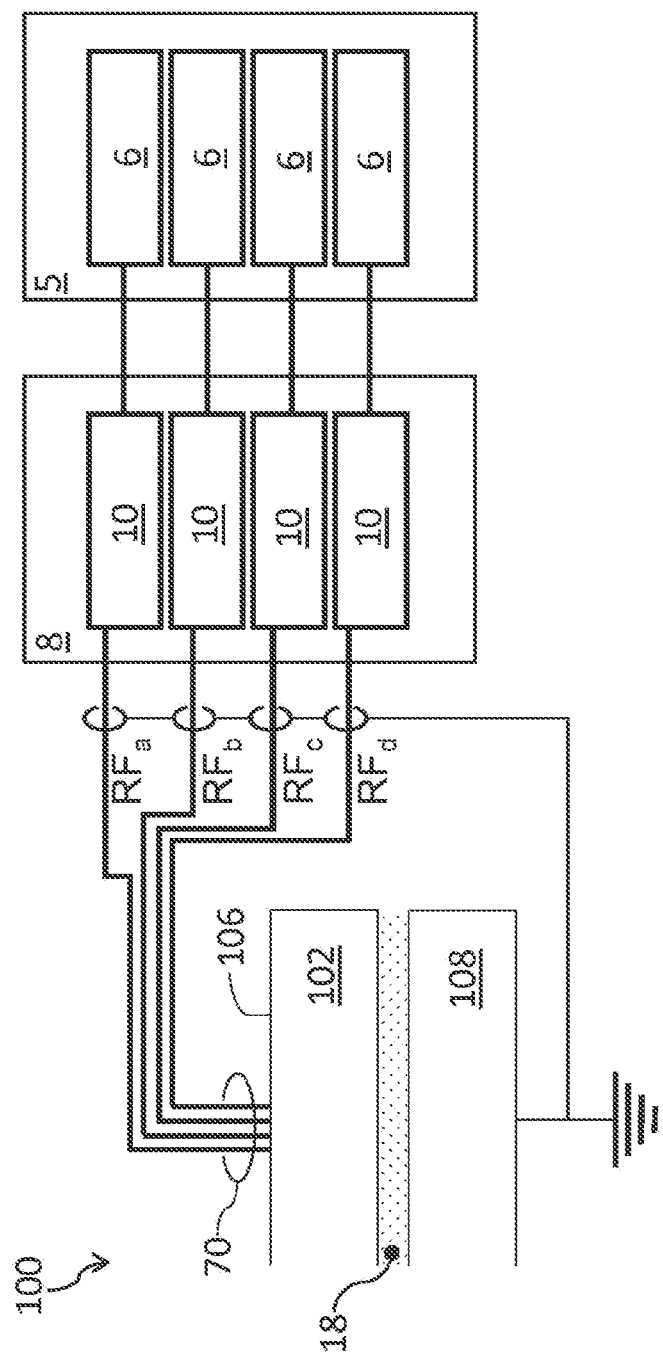
FIG. 2 is a block diagram showing principal electrical components of the laser.

FIG. 2 is a schematic block diagram showing the principal electrical components of the laser 100. An RF source 5 is provided which comprises a plurality of RF power amplifiers 6. The RF signals output from the RF power amplifiers 6 are supplied to associated impedance matching circuits 10 which together form an impedance matching network 8. The outputs of the impedance matching circuits 10 are fed into the vacuum enclosure through the vacuum flange 70. Each RF supply line is then connected separately and individually to the outwardly facing surface 106 of the top electrode 102. The impedance matching network 8 has its circuit elements distributed between the PCB module 25, the hollow conductors 62 and the vacuum flange 70.

Figure 3:
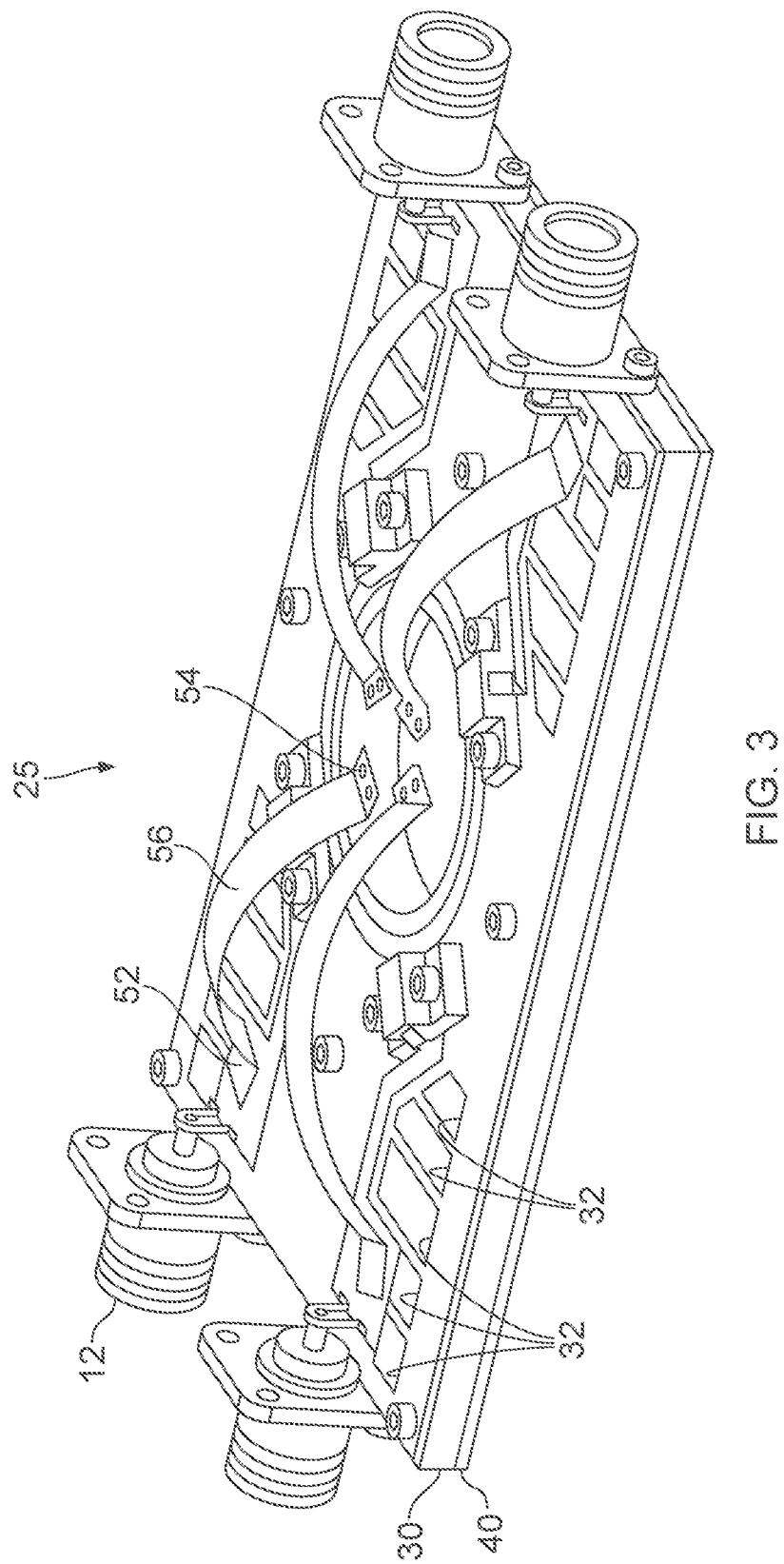
FIG. 3 is a perspective view showing further details of the construction of FIG. 1A.

FIG. 3 shows the PCB module 25 in more detail. Structurally, the PCB module 25 is built around a PCB 30. The PCB module 25 has RF power connectors 12 which are the inputs into the impedance matching circuits 10 via which the outputs from the RF power amplifiers 6 are received. The PCB 30 has an at least approximately centrally positioned aperture 34, i.e. a through-hole, which is dimensioned and positioned to allow the hollow conductors 62 to pass therethrough. The PCB module 25 accommodates components for four impedance matching circuits 10, these being arranged in four quadrants of the PCB 30 around the aperture 34. Each RF power connector 12 feeds the RF drive current received from its associated RF power amplifier 6 through an associated inductive strap (or ribbon or coil) 56 having a first end 52 and a second end 54, the inductive strap 56 forming a first inductor element. The first ends 52 are electrically connected to the upper surface of the PCB 30, for example on one of the conductive pads 32. The second ends 54 are located at or adjacent the PCB aperture 34 and are connected to respective ones of the hollow conductors 62 (not shown in FIG. 3). The PCB 30 is additionally used as a basis for forming one or more capacitors 45 for each of the impedance matching circuits 10. Namely, the PCB 30 forms a dielectric for the capacitors and the plates of each capacitor are formed respectively on the top and bottom sides of the PCB 30 by top conductive pads 32 and one or more bottom conductive pads 40. One of the conductive pads 32 of each impedance matching circuit 10 is connected to its RF power connector 12, thereby connecting each conductive pad 32 to its associated RF power amplifier 6. The bottom conductive pad 40 can be a single contiguous plate shared commonly by all the capacitors. Alternatively, a separate conductive pad 40 could be formed for each of the conductive pads 32 or for groups thereof. The inductive straps 56 are each configured to be easily removable so that different ones can be exchanged to trim the impedance matching when setting up the laser. The available inductive straps 56 may differ in shape, length and/or some other parameter which changes their inductance to allow an appropriate selection to be found.

Figure 4A:
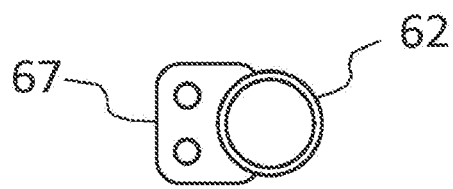
FIGS. 4A and 4B are plan and side section views of a hollow conductor.
Figure 4B:
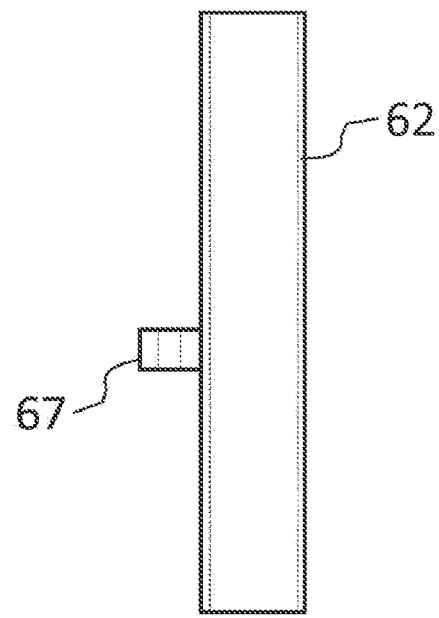

FIGS. 4A and 4B are plan and side section views of a single one of the hollow conductors 62. The hollow conductor 62 may be conveniently formed by a section of copper pipe to which is soldered or otherwise affixed a connection tab 67, which allows a second end 54 of one of the inductive straps 56 to be fastened thereto. The fastening may be done with fastening bolts (not shown) which may be screwed into threaded holes in the lateral tabs 67.

FIGS. 5A-5D show a vacuum flange 70 in plan view from above and below as well as perspective view from above and below. The vacuum flange 70 comprises a base 74, which has the form of a circular disc and is a solid piece made of metal or a metallic material, a sleeve 75, which has the form of a hollow cylinder enclosing the hollow conductors 62, and an electrically insulating connector 76, which has the form of a band or ring and is made, for example, of a ceramic material. The vacuum flange 70 is four-way, i.e. has four hollow conductors 62 integrated into it. The vacuum flange sleeve 75 is made of metal in our examples manufactured to date, but could alternatively be made of a ceramic material or other electrically insulating material as well as a metallic material. The ring-shaped connector 76 forms a junction piece between the base 74 and sleeve 75, and is inserted in between them. The upper and lower end surfaces of the ring-shaped connector may be metallized to facilitate respective solder joints being formed with the base 74 and with the sleeve 75. The outer surface of the ring-shaped connector 76 forms a vacuum-tight connection with the access aperture 116 in the vacuum housing 114. The hollow conductors 62, which are arranged extending parallel to each other, extend out of the flange 70 and are located in a vacuum-tight manner within the flange base 74, i.e. a length portion of each hollow conductor 62 is embedded in the flange base 74, e.g. with a suitable solder connection. The bottom ends of the hollow conductors 62, i.e. the vacuum-side ends, may terminate flush with the inside surface of the flange base 74, i.e. on its vacuum side, or extend out a certain distance from the inside surface of the flange base 74 (as shown in FIG. 5D). It is noted that the lateral tabs 67 are located on the air-side of the vacuum flange 70. The hollow conductors 62 and the flange base 74 collectively provide a second inductor through their self-inductance.

Figure 6:
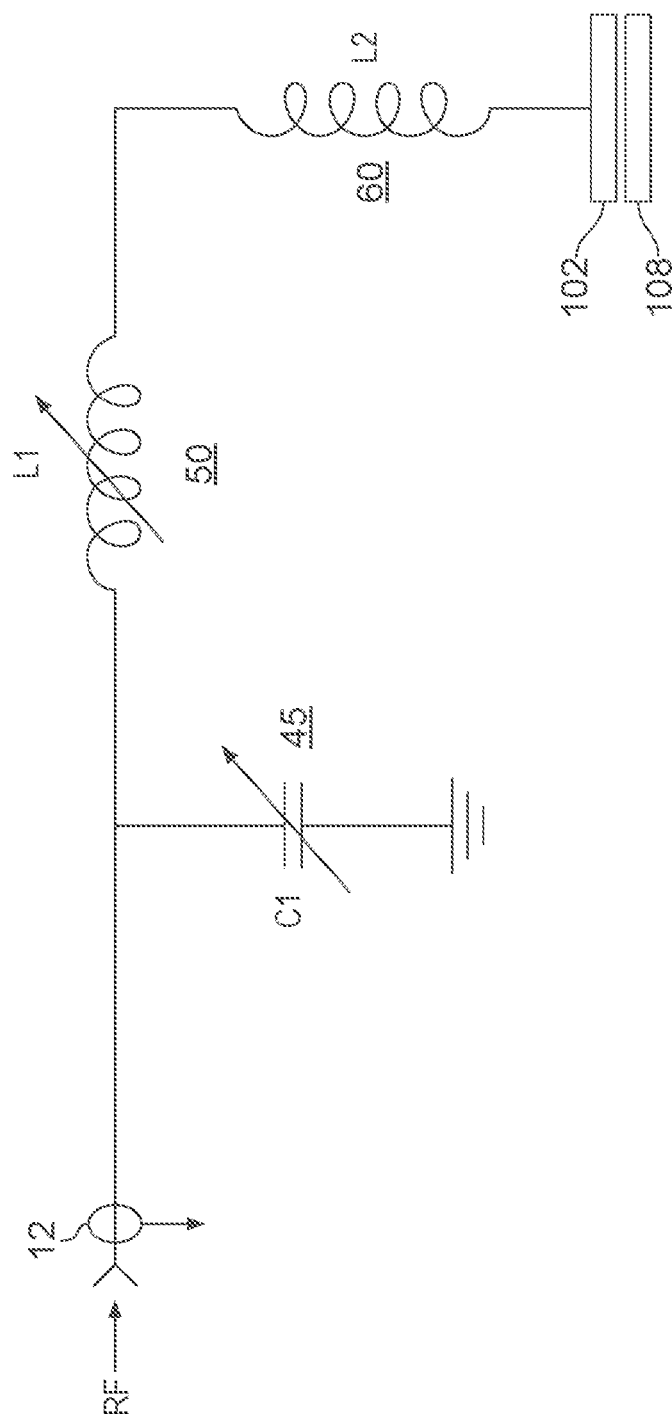
FIG. 6 is a circuit diagram of an impedance matching circuit.

FIG. 6 shows a circuit diagram of a single one of the impedance matching circuits 10. A capacitor 45 of capacitance C1 is implemented by one or more conductive pads 32 and the common conductive pad 40 with the PCB 30 acting as the dielectric. A first inductor 50 of inductance L1 is provided by one of the inductive straps 56, the inductance of which is adjustable as necessary be swapping out different ones from the available set of inductive straps 56. A second inductor 60 of inductance L2 is provided by the hollow conductor 62 and its mounting in the vacuum flange 70. The second inductance L2 is fixed in the present design and depends on the outer diameter and the length of the hollow conductors 62. It is therefore possible to design in a desired fixed value for L2 by adjusting these dimensions. Increasing the outer diameter of the hollow conductors 62 reduces the inductance L2 and increasing the length of the hollow conductors 62 increases the inductance L2. The first and second inductors 50 and 60 are electrically connected to the RF power amplifier 6 in series and the capacitor 45 is electrically connected to the RF power amplifier 6 in parallel with the inductors 50 and 60. Optionally, the impedance matching circuit 10 may additionally include one or more reactances or reactive impedance components (resistive, capacitive, inductive or a combination of these) (not shown), which may be arranged on the PCB 30. The reactances can be electrically connected to any of: the RF power connectors 12, the conductive pads 32, the inductive straps 56 and the hollow conductors 62 either in parallel or in series, as necessary for achieving desired impedance matching between the RF power amplifier 6 and the top electrode 102.

Figure 7:
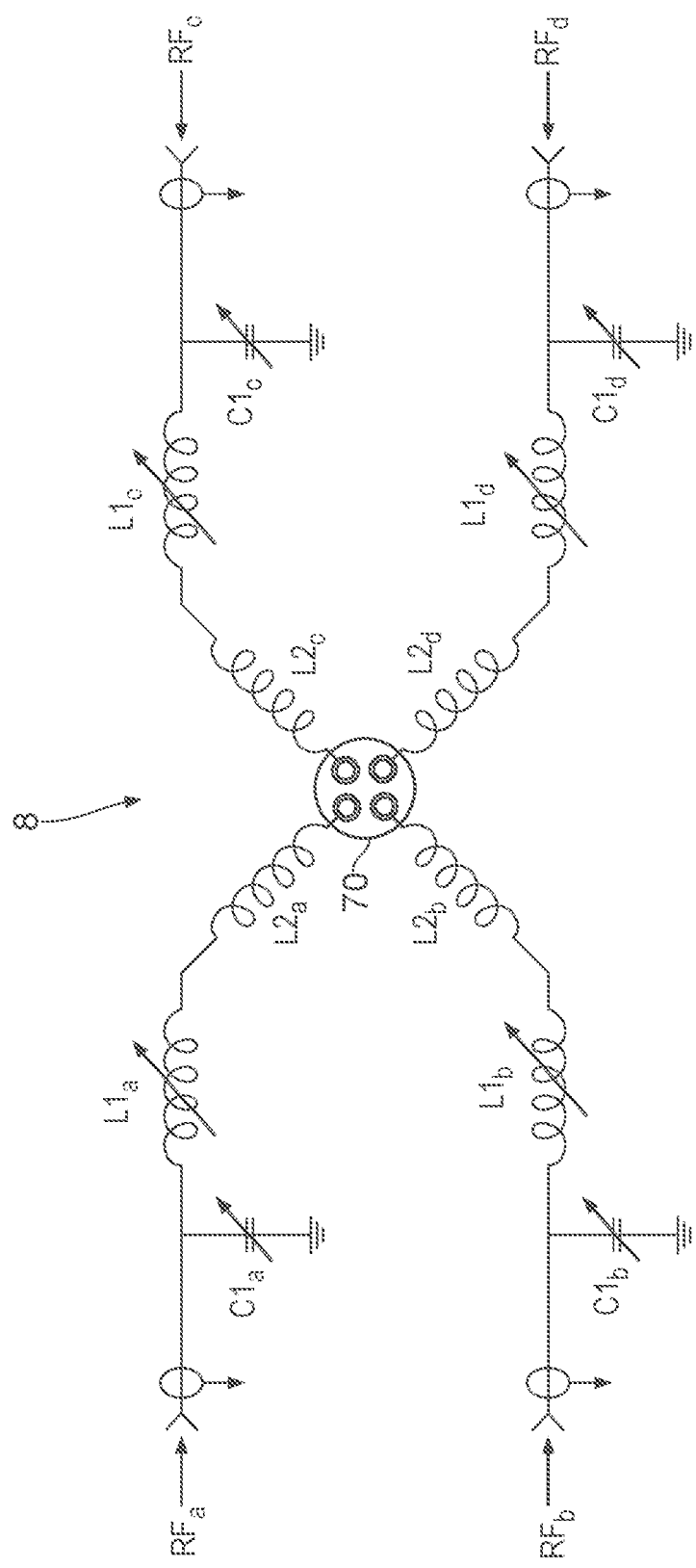
FIG. 7 is a circuit diagram of an impedance matching network consisting of four impedance matching circuits as shown in FIG. 6.

FIG. 7 is a circuit diagram showing the impedance matching network 8 consisting of four of the impedance matching circuits 10 shown in FIG. 6 which deliver four RF supply lines through the vacuum flange 70 as described above. Capacitors C1a, C1b, C1c and C1d are the capacitors implemented by conductive pads 32 and 40. First inductors L1a, L1b, L1c and L1d are respective ones of the first inductors 50 formed by the inductive straps 56, whose inductance is changeable as needed. Second inductors L2a, L2b, L2c and L2d are respective ones of the second inductors 60 formed by respective ones of the hollow conductors 62. The capacitors C1a, C1b, C1c and C1d are electrically connected to four RF power amplifiers 6 in parallel. The first inductors L1a, L1b, L1c and L1d and the second inductors L2a, L2b, L2c and L2d are electrically connected to the four RF power amplifiers 6 in series. As described in U.S. Pat. No. 9,263,849B2, this configuration of an RF source 5 with multiple RF power amplifiers 6 and associated impedance matching circuits 10, which are each connected individually and separately to adjacent locations on the top electrode 102, serves to deliver multiple RF power supply lines at multiple locations on the top electrode 102. This can significantly reduce RF power loss compared with a standard design where multiple RF power supplies have their outputs combined outside the vacuum enclosure and fed through a single impedance matching circuit before being delivered to the top electrode through a single supply line. The heat generated by the impedance matching circuit is proportional to the square of the current. As a consequence a design having 'n' independent RF supply lines with associated impedance matching circuits that supply to 'n' locations on the top electrode means that each supply line carries one n-th of the total current injected into the live electrode, instead of a single RF supply line output from a single impedance matching circuit. This reduces the amount of heat generated by a factor 'n', e.g. a factor of four in the example of having four pairs of RF power amplifier and impedance matching circuit.

FIGS. 8A-8D correspond to FIGS. 5A-5D and show another example vacuum flange 70 which differs from that of FIGS. 5A-5D in that there are eight hollow conductors instead of four.

Figure 9:
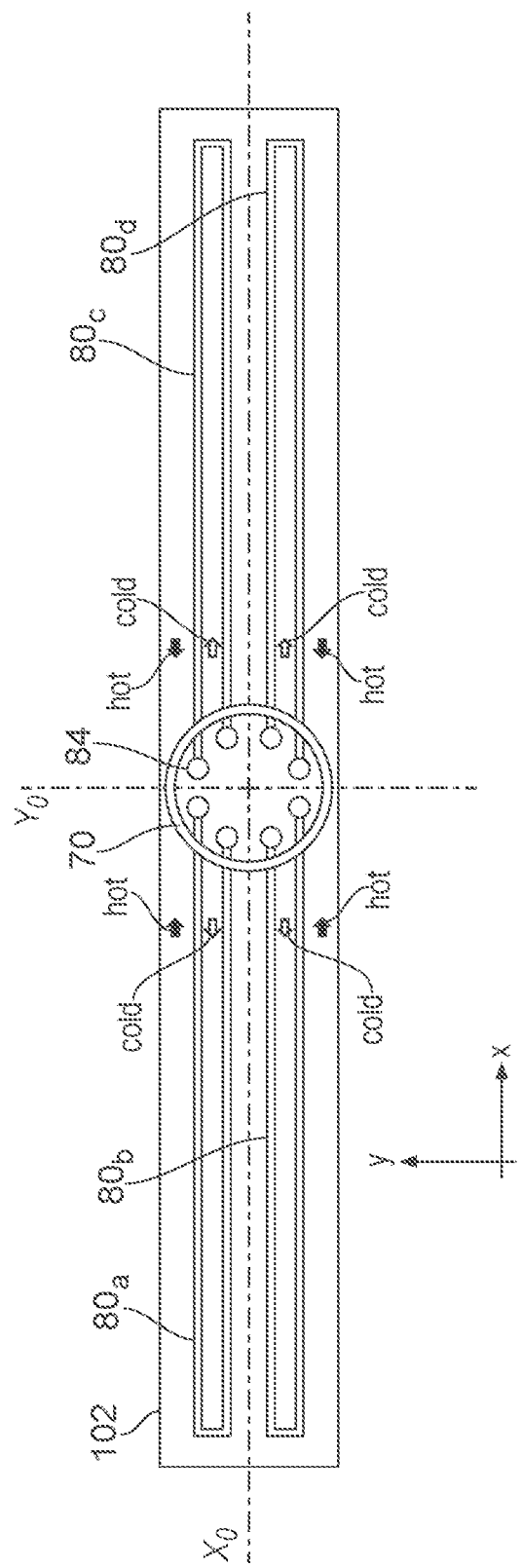
Figure 10:
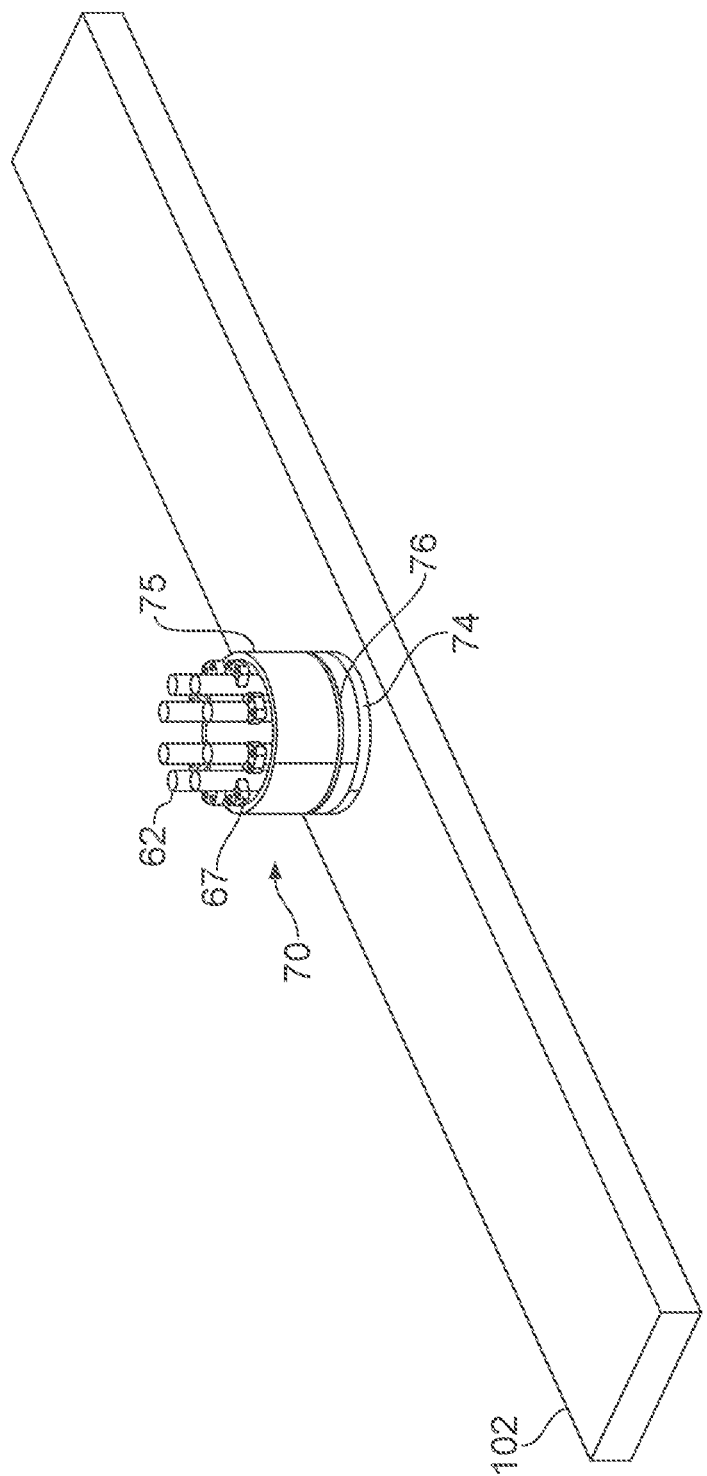

FIGS. 9 and 10 show in plan and perspective view a top electrode 102 and vacuum flange 70, the vacuum feedthrough being as shown in FIGS. 8A-8D. The top electrode 102 is provided with internal passages that form four fluid circulation channels 80a, 80b, 80c, 80d each with its own input and output apertures 84 on the external (top) surface of the electrode 102. A useful feature of this design with four fluid circulation channels is that the cooling is relatively even across the electrode both lengthways and crossways when viewed in plan view and also symmetric both lengthways (x-direction) and crossways (y-direction), i.e. symmetric about both a centrally positioned crossways plane Y0 and a centrally positioned lengthways plane X0 as illustrated. For example, to provide a more uniform temperature difference between the fluid circulation channels, the flow paths can be arranged such that the outward flow paths are arranged laterally on the inside and the inward flow (return) paths are arranged laterally on the outside. The coolant fluid entering the electrode, which is cold, is therefore piped through the more central part of the electrode 102 body (closer to the X0 plane), where the electrode would be the hottest absent any cooling, whereas the warmer coolant fluid returning from the electrode ends flows closer to the sides of the electrode (farther away from the X0 plane), thereby reducing the temperature gradient crossways across the electrode. Although there may be some temperature gradient lengthways along the electrode as the distance increases from the central location of the vacuum flange 70 (i.e. distance from Y0 plane) as a consequence of the coolant fluid warming up, any such lengthwise temperature gradient will be gradual.

Figure 11A:
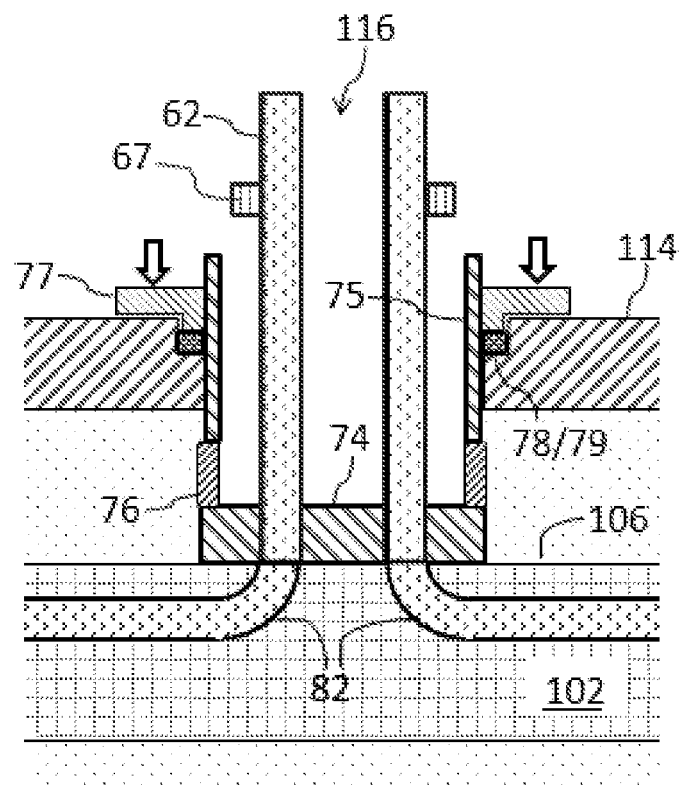
FIGS. 11A, 11B and 11C show three different implementation examples for arranging the hollow conductors to supply RF drive signal and coolant fluid to the top electrode.
Figure 11B:
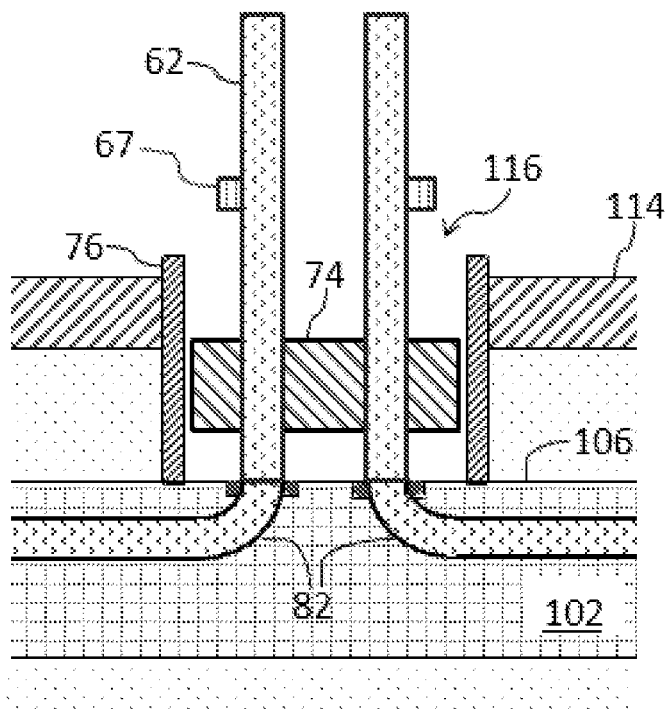
Figure 11C:
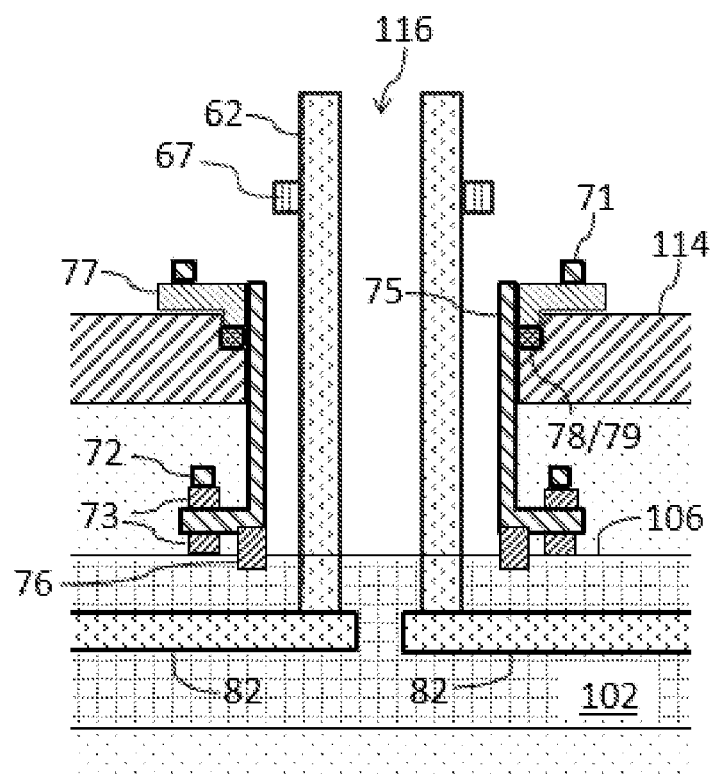

FIGS. 11A, 11B and 11C are schematic section views showing three different implementation examples for arranging the hollow conductors to supply RF drive signal and coolant fluid to the top electrode.

FIG. 11A shows an arrangement as described above and shown, for example in FIGS. 5A-5D. The vacuum housing 114 encloses a vacuum space which is indicated by stippling in the drawing. The top electrode 102 is arranged inside the vacuum space and by way of example two of the internal passages 82 are shown, these forming the channels for circulating coolant fluid around the top electrode 102. The passages 82 terminate in apertures in the outwardly facing surface of the top electrode. A ring-shaped connector 76 forms a butting, vacuum-tight connection with the vacuum flange base 74. A vacuum flange sleeve 75 is arranged in butting, vacuum-tight connection over the ring-shaped connector 76. An upper portion of the outer surface of the vacuum flange sleeve 75 forms a vacuum-tight connection with the inside rim surface of the vacuum housing aperture 116 via an O-ring 78 which sits in an annular groove 79 formed in the top surface of the vacuum housing 114 adjacent its aperture 116. The O-ring 78 is squashed down and laterally extended to form the vacuum-tight connection between vacuum housing 114 and sleeve 75 via a flange piece 77 that is screwed down on the top surface of the vacuum housing 114 as indicated schematically by the downward arrows. Length portions of the hollow conductors 62 are embedded in the vacuum flange base 74 in a vacuum-tight manner. The vacuum flange base 74 is made of electrically conducting material. The inwardly facing surface of vacuum flange base 74 is connected with the outwardly facing surface of the top electrode 102 in a fluid-tight and vacuum-tight manner. The proximal ends of the hollow conductors 62 align with the fluid input and output apertures of the passages 82 to provide a fluid-tight connection for the coolant fluid circulation paths. With this implementation, since the bottom, inwardly facing surface of the vacuum flange base 74 abuts or is fixedly connected to the outwardly facing surface of the top electrode 102 in a fluid-tight and vacuum-tight manner, all that is needed for the coolant fluid circulation path to be formed is alignment of the passage apertures and the proximal ends of the hollow conductors and a fluid-tight connection where they meet. The proximal ends of the hollow conductors also need to be in good electrical contact with the top electrode in order for the RF drive signal to be transmitted.

FIG. 11B shows an alternative implementation example which is described by comparison with the example of FIG. 11A. In this example, the electrically insulating connector 76 extends from the access aperture 116 of the vacuum housing 114 down into the vacuum space all the way to the outwardly facing surface of the top electrode 102 where it forms a vacuum-tight seal with the first electrode. The electrically insulating connector 76 is shaped and dimensioned in plan view to match the shape and dimensions of the access aperture 116, so in the illustrated example has the shape of a cylindrical tube to match the circular shape of the access aperture 116. A suitable ceramic material may be used for the connector 76. The vacuum-tight connection between the electrically insulating connector 76 and the top electrode 102 may be effected by any suitable means. For example, at its proximal end the ceramic tube connector 76 could be vacuum-sealed to the top electrode by pushing it into an annular groove cut into the top of the electrode which accommodates a sealing O-ring (not shown). Another option would be to braze or otherwise affix an intermediate metal ring to the proximal end of the ceramic tube connector 76 to allow the intermediate metal ring to be brazed to the top electrode 102. An advantage of this implementation is that the hollow conductors do not enter the vacuum space, so their proximal end connections to the top electrode 102 are also outside the vacuum space, so only need to be fluid-tight, i.e. they do not need to be vacuum-tight. This may be effected with any suitable means; by way of example the drawing shows O-rings seated in counterbored recesses at the input and output apertures. It is further noted that in the illustration a base 74 is included which has the hollow conductors embedded into it but which is not functionally part of the vacuum flange 70. The vacuum flange 70 in this embodiment consists solely of the electrically insulating connector 76. The base 74 in the illustrated example merely serves to mechanically and electrically connect the hollow conductors, which may be convenient but is not essential. In variants of this design, the illustrated base 74 may be omitted.

FIG. 11C shows a further alternative implementation example which is described by comparison with the examples of FIGS. 11A and 11B. The vacuum seal to the vacuum housing 114 is implemented in a similar manner to FIG. 11A with a flange piece 77 that is screwed down on the top surface of the vacuum housing 114 by clamping bolts 71 which pass through the flange piece 77 and screw into threads in the top surface of the vacuum housing 114 thereby to press and distend the O-ring 78 to form a vacuum-tight connection between the inside rim surface of the vacuum housing aperture 116 and the outside surface of the vacuum flange sleeve 75. The O-ring 78 sits in an annular groove 79 formed in the top surface of the vacuum housing 114 adjacent its aperture 116. A suitable alternative to using an O-ring would be to use an indium gasket or wire. The vacuum-tight seal to the outwardly facing surface 106 of the top electrode 102 is however formed differently compared to the design of FIG. 11A. The vacuum flange sleeve 75 has an outer flange at its base, i.e. proximal the top electrode 102, which has through holes to allow the vacuum flange sleeve 75 to be bolted down on the top electrode 102 with clamping bolts 72. One part of the electrical isolation between the (metal) vacuum flange sleeve 75 (which is grounded) and the top electrode (which is live) is ensured through the provision of upper and lower annular ceramic spacers 73 through which the clamping bolts 72 pass. The clamping bolts (which are live) are thus electrically isolated from the vacuum flange sleeve 75. The lower ceramic spacers 73 have a cylindrical form. The upper ceramic spacers are cup-like to support the underside of the bolt heads of the bolts 72. Another part of the electrical isolation between the (metal) vacuum flange sleeve 75 (which is grounded) and the top electrode (which is live) is ensured through the provision of an annular electrically insulating connector 76 with the shape of a hollow cylinder which is sandwiched between the base of the vacuum flange sleeve 75 and the outwardly facing surface 106 of the top electrode 102. A suitable material for the insulating connector 76 is a ceramic material. As illustrated a locating groove for the insulating connector 76 may be formed in the outwardly facing surface 106 of the top electrode 102 as well as a similar locating groove in the base of the vacuum flange sleeve 75. A vacuum seal is formed between the upper surface of the insulating connector 76 and the lower surface of the base of the vacuum flange sleeve 75 and a further vacuum seal is formed between the lower surface of the insulating connector 76 and the outwardly facing surface 106 of the top electrode 102. There are various ways to form the two metal-ceramic vacuum seals including: brazing, soldering, providing an indium gasket or wire, and providing an O-ring. Moreover, in this example, the hollow conductors 62 are directly embedded in the uppermost depth portion of the top electrode 102 and penetrate to form a fluid flow connection with respective ones of the internal coolant passages 82 for liquid supply or removal. The end portions of the hollow conductors 62 that are embedded in the top electrode 102 form fluid-tight connections. Similar to the example of FIG. 11B, an advantage of this implementation is that the hollow conductors do not enter the vacuum space, so their proximal end connections to the top electrode 102 are also outside the vacuum space, so only need to be fluid-tight, i.e. they do not need to be vacuum-tight.

Various modifications from the specific embodiments described above may be envisaged.

An embodiment can be envisaged with one fluid circulation channel supplied by two hollow conductors electrically connected to two impedance matching circuits supplied from two RF power amplifiers. Generally a convenient arrangement is when one pair of hollow conductors is associated with one fluid circulation channel. Moreover, the number of circulation channels that pass coolant around the top electrode can be freely chosen, i.e. is not restricted to 2 or 4 as in the illustrated examples, but may be any number from 1 to 5, 6, 7, 8 or more. Furthermore, alternative designs for the coolant passages in the top electrode may be envisaged in which a single hollow conductor has its fluid flow split into two (or more) as it enters the top electrode to supply two (or more) different coolant channels within the top electrode. These two (or more) coolant channels could remain separate downstream and have their fluid extracted by two (or more) hollow conductors. Alternatively, these two (or more) coolant channels could come back together downstream where they terminate at an aperture in the outwardly facing surface of the top electrode and have their coolant fluid extracted by a single hollow conductor. In other words, designs can be envisaged which do not have a two-to-one ratio of the number of hollow conductors to fluid circulation channel(s).

Moreover, it will be understood that the same arrangement as described in detail above for the top electrode may be replicated for the bottom electrode. This may be of interest in particular for designs in which both the top and bottom electrodes are driven with RF, i.e. when an RF source is connected to the outwardly facing surfaces of both the top and bottom electrodes, the bottom electrode thereby being supplied with an additional RF electrical drive signal that is out of phase with the RF electrical drive signal supplied to the top electrode.

It will be clear to one skilled in the art that many improvements and modifications can be made to the foregoing exemplary embodiments without departing from the scope of the present disclosure.

REFERENCE NUMERALS

5 RF supply
6 RF power amplifier
8 impedance matching network
10 impedance matching circuit
12 RF power connector
18 plasma discharge
20 rear mirror
22 front mirror (output coupler)
24 output beam
25 PCB module
30 printed circuit board (PCB)
32 top conductive pads
34 aperture
40 bottom conductive pad(s)
45 capacitor
50 first inductor
52 first end of 56
54 second end of 56
56 inductive strap (or ribbon or coil)
60 second inductor
62 hollow conductor
67 connection tab of hollow conductor 66
70 vacuum flange
71 clamping bolts for clamping flange 77
72 clamping bolts for outer flange of vacuum flange sleeve 75
73 annular ceramic spacers for clamping bolts 72
74 vacuum flange base (e.g. circular disc)
75 vacuum flange sleeve (e.g. hollow cylinder with optional integral outer flange)
76 electrically insulating connector (e.g. ceramic ring)
77 clamping flange
78 O-ring
79 groove in outer surface of vacuum housing
80 fluid circulation channel (80a, 80b; 80a, 80b, 80c, 80d)
82 internal passages in cooled electrode
84 apertures in outwardly facing surface of cooled electrode
86 pipe fitting union connections (plastic)
88 coolant pipes
C1 capacitor
L1 first inductor
L2 second inductor
100 RF slab laser
102 top electrode
104 top electrode inwardly facing surface
106 top electrode outwardly facing surface
108 bottom electrode
110 bottom electrode inwardly facing surface
112 bottom electrode outwardly facing surface
114 vacuum housing
116 access aperture

The invention claimed is:

1. A radio frequency, RF, slab laser comprising:
a first electrode and a second electrode having respective inwardly and outwardly facing surfaces, wherein their respective inwardly facing surfaces face each other and are spaced apart by a gap forming a slab waveguide of a thickness dimensioned to allow a plasma discharge to be formed by driving at least the first electrode with an RF drive signal, the first electrode being provided with at least one fluid circulation channel for distributing coolant fluid around the first electrode;
a vacuum housing having an access aperture adjacent the outwardly facing surface of the first electrode and enclosing at least the inwardly facing surfaces of the first and second electrodes inside a vacuum space;
a plurality of hollow conductors connected to the outwardly facing surface of the first electrode to supply the RF drive signal to the first electrode and the coolant fluid to the at least one fluid circulation channel of the first electrode; and
a vacuum flange arranged in the access aperture to form a vacuum-tight seal with the vacuum housing and a further vacuum-tight seal with the outwardly facing surface of the first electrode.

2. The laser of claim 1, wherein the vacuum flange comprises a sleeve, an electrically insulating connector and a base, the base having an intermediate length portion of each hollow conductor embedded therein in a vacuum-tight manner, and the electrically insulating connector being connected with respective vacuum-tight connections between the sleeve and the base, wherein the sleeve forms said vacuum-tight seal with the vacuum housing and wherein the base forms said further vacuum-tight seal with the outwardly facing surface of the first electrode.

3. The laser of claim 1, wherein the vacuum flange comprises an electrically insulating connector extending from the access aperture, where it forms said vacuum-tight seal with the vacuum housing, to the outwardly facing surface of the first electrode, where it forms said further vacuum-tight seal with the outwardly facing surface of the first electrode, thereby defining a portion of the outwardly facing surface of the first electrode that is outside the vacuum space to which the hollow conductors are connected.

4. The laser of claim 1, wherein the vacuum flange comprises a sleeve and an electrically insulating connector, wherein the sleeve forms said vacuum-tight seal with the vacuum housing and wherein the insulating connector forms said further vacuum-tight seal with the outwardly facing surface of the first electrode.

5. The laser of claim 1, wherein each fluid circulation channel comprises at least one internal passage formed within the first electrode having ends that terminate in fluid input and output apertures in a surface of the first electrode, the fluid input and output apertures being arranged in fluid-flow connection with proximal ends of the hollow conductors.

6. The laser of claim 5, wherein the fluid input and output apertures are arranged aligned with the proximal ends of the hollow conductors.

7. The laser of claim 1, wherein the at least one fluid circulation channel comprises further hollow conductors arranged in thermal contact with the outwardly facing surface of the first electrode and in fluid-flow connection with the hollow conductors.

8. The laser of claim 1, wherein the first electrode has an elongate shape with a length at least ten times greater than its width and the hollow conductors connect to the first electrode at least approximately mid-way along the outwardly facing surface of the first electrode, thereby subdividing the first electrode into first and second arms.

9. The laser of claim 8, wherein the at least one fluid circulation channel comprises a first fluid circulation channel extending around the first arm of the first electrode and a second fluid circulation channel extending around the second arm of the first electrode.

10. The laser of claim 9, wherein the first fluid circulation channel is connected to be supplied with coolant fluid by first and second ones of the hollow conductors and wherein the second fluid circulation channel is connected to be supplied with coolant fluid by third and fourth ones of the hollow conductors.

11. The laser of claim 8, wherein the at least one fluid circulation channel comprises first and second fluid circulation channels extending around the first arm of the first electrode and third and fourth fluid circulation channels extending around the second arm of the first electrode.

12. The laser of claim 11, wherein the first fluid circulation channel is connected to be supplied with coolant fluid by first and second ones of the hollow conductors and wherein the second fluid circulation channel is connected to be supplied with coolant fluid by third and fourth ones of the hollow conductors, wherein the third fluid circulation channel is connected to be supplied with coolant fluid by fifth and sixth ones of the hollow conductors and wherein the fourth fluid circulation channel is connected to be supplied with coolant fluid by seventh and eighth ones of the hollow conductors.

13. The laser of claim 11, wherein the first and second fluid circulation channels are jointly arranged to cool either side of the first arm, wherein the third and fourth fluid circulation channels are jointly arranged to cool either side of the second arm, thereby to avoid a temperature gradient forming crossways between opposite sides of the first electrode.

14. The laser of claim 1, further comprising a plurality of RF amplifiers and associated impedance matching circuits for generating a plurality of components of the RF drive signal, respective ones of the hollow conductors being connected to receive respective ones of the RF drive signal components output from respective ones of the impedance matching circuits.

15. The laser of claim 14, wherein the RF amplifiers, impedance matching circuits, and hollow conductors are connected to form one or more groups, each group consisting of two RF amplifiers, two impedance matching circuits and two hollow conductors.

16. The laser of claim 15, wherein each said group is associated with one circulation channel.

* * * * *